United States Patent
Dehlsen et al.

[11] Patent Number: 6,091,161
[45] Date of Patent: Jul. 18, 2000

[54] METHOD OF CONTROLLING OPERATING DEPTH OF AN ELECTRICITY-GENERATING DEVICE HAVING A TETHERED WATER CURRENT-DRIVEN TURBINE

[75] Inventors: James G. P. Dehlsen; James B. Dehlsen; Geoffrey F. Deane, all of Santa Barbara, Calif.

[73] Assignee: Dehlsen Associates, L.L.C., Santa Barbara, Calif.

[21] Appl. No.: 09/229,010

[22] Filed: Jan. 12, 1999

Related U.S. Application Data

[60] Provisional application No. 60/107,263, Nov. 3, 1998.

[51] Int. Cl.$^7$ .................................................. F03B 13/10
[52] U.S. Cl. ........................... 290/43; 290/54; 60/398; 415/7
[58] Field of Search .................. 290/42, 43, 44, 290/53, 54, 55; 60/398; 415/7

[56] References Cited

U.S. PATENT DOCUMENTS

| | | | |
|---|---|---|---|
| 2,501,696 | 3/1950 | Souczek | 290/43 |
| 3,209,156 | 9/1965 | Struble, Jr. | 290/54 |
| 3,986,787 | 10/1976 | Mouton, Jr. et al. | 415/7 |
| 4,205,943 | 6/1980 | Vauthier | 416/86 |
| 4,219,303 | 8/1980 | Mouton, Jr. et al. | 415/7 |
| 4,306,157 | 12/1981 | Wracsaricht | 290/54 |
| 4,313,059 | 1/1982 | Howard | 290/54 |
| 4,383,182 | 5/1983 | Bowley | 290/43 |
| 4,520,273 | 5/1985 | Rowe | 290/54 |
| 4,843,249 | 6/1989 | Bussiere | 290/53 |
| 4,850,190 | 7/1989 | Pitts | 60/398 |
| 5,440,176 | 8/1995 | Haining | 290/54 |

Primary Examiner—Nicholas Ponomarenko
Attorney, Agent, or Firm—Owen L. Lamb

[57] ABSTRACT

A method is described of controlling a tethered, underwater, water current-driven turbine, power-generating device. A predetermined maximum depth and a predetermined minimum depth are set. In response to sensing depth of the device, an ascend protocol or a descend protocol are selectively invoked. These protocols maintain an operating depth of the device that is midway between the predetermined maximum depth and the predetermined minimum depth. The turbine includes variable-pitch rotor blades. A maximum allowable drag force load on the turbine rotors is selected. The pitch of the variable-pitch rotor blades on the turbine is adjusted such that the drag force loading of the device does not exceed a maximum design level.

40 Claims, 11 Drawing Sheets

METHOD OF CONTROLLING OPERATING DEPTH OF AN ELECTRICITY-GENERATING DEVICE HAVING A TETHERED WATER CURRENT-DRIVEN TURBINE

CROSS REFERENCE TO RELATED APPLICATION

This application is related to provisional application Ser. No. 60/107,263 entitled "Tethered Underwater Electricity Generating Apparatus, System And Method" filed Nov. 3, 1998, which is incorporated herein by reference.

BACKGROUND OF THE INVENTION

1. Field of the Invention

This invention relates to hydroelectric power-generating devices that use underwater currents to drive electricity-generating turbines.

2. Description of the Prior Art

The use of underwater power generators for generating electricity from water current flow, such as rivers and oceans, is known in the art. There are two types of prior devices: stationary turbines and tethered turbines. Stationary types of turbines are comprised of stationary towers based on the ocean floor. Electricity generating turbines are mounted on the towers at a fixed depth, with turbine rotor blades facing the flow of an ocean current. The disadvantages of this type of design are the underwater construction costs, the inability to service the turbines on the surface, and fact that the depth of the turbines cannot be changed to adjust for ocean currents that are not constant year round at the fixed depth. An example of this type of device is a 300 kW current turbine under development by the British having 20-meter diameter rotor blades. The turbines are mounted at a fixed depth on towers to be deployed in currents around the British Isles.

Tethered devices are designed to operate underwater, and are kept in place by a tether that is anchored to the ocean floor. In some cases, a wing (hydrofoil) provides lift and/or ballast tanks provide buoyancy to keep the devices from descending. Some devices use a buoyancy chamber to regulate their overall buoyancy thereby adjusting their operating depths in a current stream. Other devices add a moveable wing that serves as a stabilizer to control the depth of the device. The wing is adjusted to cause the device to dive or surface in response to emergency conditions such as floating debris on a river.

An example of this type of turbine device is an underwater power plant called the Coriolis Project. The design called for a ducted, catenary turbine, 171 meters in diameter, capable of producing 83 MW of electricity. The turbine was to be tethered at a fixed depth.

What is needed is a way of controlling a tethered, underwater, water current-driven turbine, power-generating device. In order to keep installation and maintenance costs of such a device down, it is desirable to provide minimal underwater structures and construction. This means that one must be able to safely bring the device to the surface for maintenance or for replacement of single or multiple turbines without altering the arrays, consisting of a plurality of turbine modules.

Since recent studies have shown that underwater ocean current speeds vary seasonally at a given depth, programmable controls are desirable for the precise adjustment of operating depth. The turbine modules' lift and buoyancy should be adjusted periodically at different times of the year to compensate for predictable seasonal current velocity changes. The depth should also be adjustable as required to compensate for unpredictable short-term underwater current changes.

It is also desirable to provide for emergencies that require a complete shutdown of the device, with or without immediate surfacing of the device for maintenance or repair.

SUMMARY OF THE INVENTION

To achieve the above goals and in accordance with an aspect of the present invention, the depth of the device is sensed and an ascend protocol is invoked to maintain a predetermined maximum depth in the water current, and a descend protocol is invoked to maintain a predetermined minimum depth in the water current.

In accordance with another aspect of the invention, the turbine includes variable-pitch rotor blades. The pitch of the variable-pitch rotor blades is adjusted such that the drag force loading of the device may be controlled.

In accordance with another aspect of the invention, the ascend and descend protocols comprise balancing positive and negative vertical forces by altering the combination of lift, drag, and buoyant forces produced by the device. The translation of the drag force towards the underwater floor is offset by combining variable buoyancy of the device with lift forces produced by a main hydrofoil. The lift produced by the main hydrofoil is altered, by adjusting the pitch of a moveable stabilizer, by altering the location of the center of buoyancy by relocating water held within ballast chambers, by increasing or decreasing the effects of a spoiler located on the hydrofoil, or by another method, such that the device remains within a predetermined range of operating depths in the water current. This range is defined by a selected maximum and minimum depth, with the predetermined depth located preferably midway between these limits.

In accordance with an aspect of the invention, an emergency shutdown command causes the pitch of the variable-pitch rotor blades to be adjusted such that the rotor rotation and power output of the device are reduced to substantially zero. The lift, vertical translation of the drag, and buoyancy forces may be adjusted to remain in balance, maintaining the device within said depth limits until the device may be surfaced for maintenance or repair.

BRIEF DESCRIPTION OF THE DRAWINGS

The invention will be described in detail with reference to the drawings in which.

DESCRIPTION OF THE PREFERRED EMBODIMENT

Figure 1:
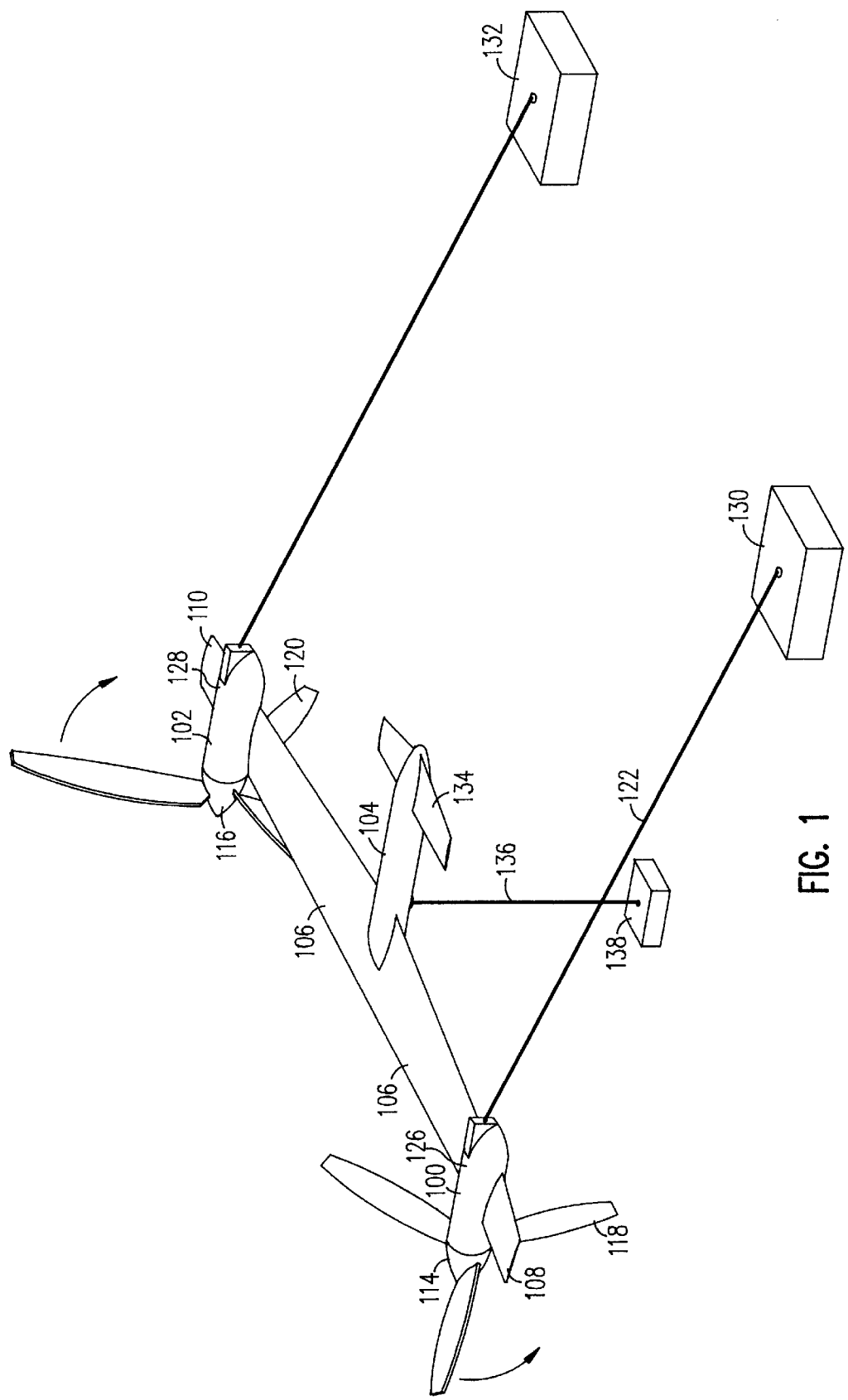
FIG. 1 illustrates an underwater power-generating device in which the present invention is embodied.

FIG. 1 illustrates an underwater power-generating device. The underwater power-generating device includes a pair of electric generators housed in fluid-tight nacelles 100 and 102, which are connected together by a hydrofoil structure. The hydrofoil structure consists of a central section 104 and a pair of wings outboard of the nacelles ("wing tips") 108 and 110. The hydrofoil wing tips are canted upward to provide roll stability.

The central section 104 and wing 106 contain one or more cylindrical ballast tanks that span the distance between nacelles. The ballast tanks are used to provide variable buoyancy and forward-aft weight shifting between ballast tanks and to serve as the structural members connecting the nacelles. The hydrofoil structure positions and supports the nacelles 100 and 102 on the upper surface of the wing 106 with each of the nacelles located at the ends of the central hydrofoil structure.

Each generator has a rotor 114 and 116 with variable pitch blades, 118 and 120, respectively, which rotate in opposite directions so that the torque forces on the structure balance. The power-generating device is tethered underwater in the path of the water current by a pair of tethers 122, 124. The rotors 114 and 116 are positioned relative to the hydrofoil 106 such that water current first moves past the wing 106, then engages, and causes rotation of the rotors 114 and 116. The tethers extend from tether-connecting members 126, 128, in the nose of each nacelle 100 and 102, to anchoring members 130, 132, located on the ocean floor. Each of the tether-connecting members 126, 128, includes a tether-adjusting capstan which, when activated, shortens or lengthens each tether to eliminate yaw.

A pitch-adjusting stabilizer 134 is connected to the central section 104 of the hydrofoil structure. The pitch-adjusting stabilizer is positioned to extend upstream in a direction from the wing 106 so that the water current passes over the pitch-adjusting stabilizer first before encountering the wing. It will be understood by those skilled in the art that the pitch-adjusting stabilizer 134 may alternatively be positioned downstream such that water current first moves past the hydrofoil before passing over the pitch-adjusting stabilizer, or may be incorporated as moving parts of the trailing edge of the hydrofoil, similar to the flaps on an airplane wing.

The wing 106 is cambered to increase the magnitude of the lifting forces exerted by the flow over the wing. In the preferred embodiment of the invention the wing includes a plurality of separate ballast tank chambers capable of being filled with fluid and of having fluid added or purged therefrom to incrementally control buoyancy of the underwater power-generating device. Each tank chamber may be either completely empty or full, or may contain baffles so that there is minimal movement of fluid in the tank, which would cause instability of the device. By filling and purging separate tanks, incremental changes in buoyancy and changes in the location of the center of buoyancy can be achieved. Additionally, each nacelle has a buoyancy tank that can be independently filled or purged to compensate for roll of the device.

The underwater power-generating device may include a winch positioned on the bottom of the central section 104. A third tether 136 may be coupled between the winch and an anchoring member 138 located on the ocean floor, such that the winch can restrain the device from rising, countering lift and buoyancy produced by the hydrofoil and ballast chambers, respectively. The underwater power-generating device will benefit from the added stability of three tethers.

Figure 2:
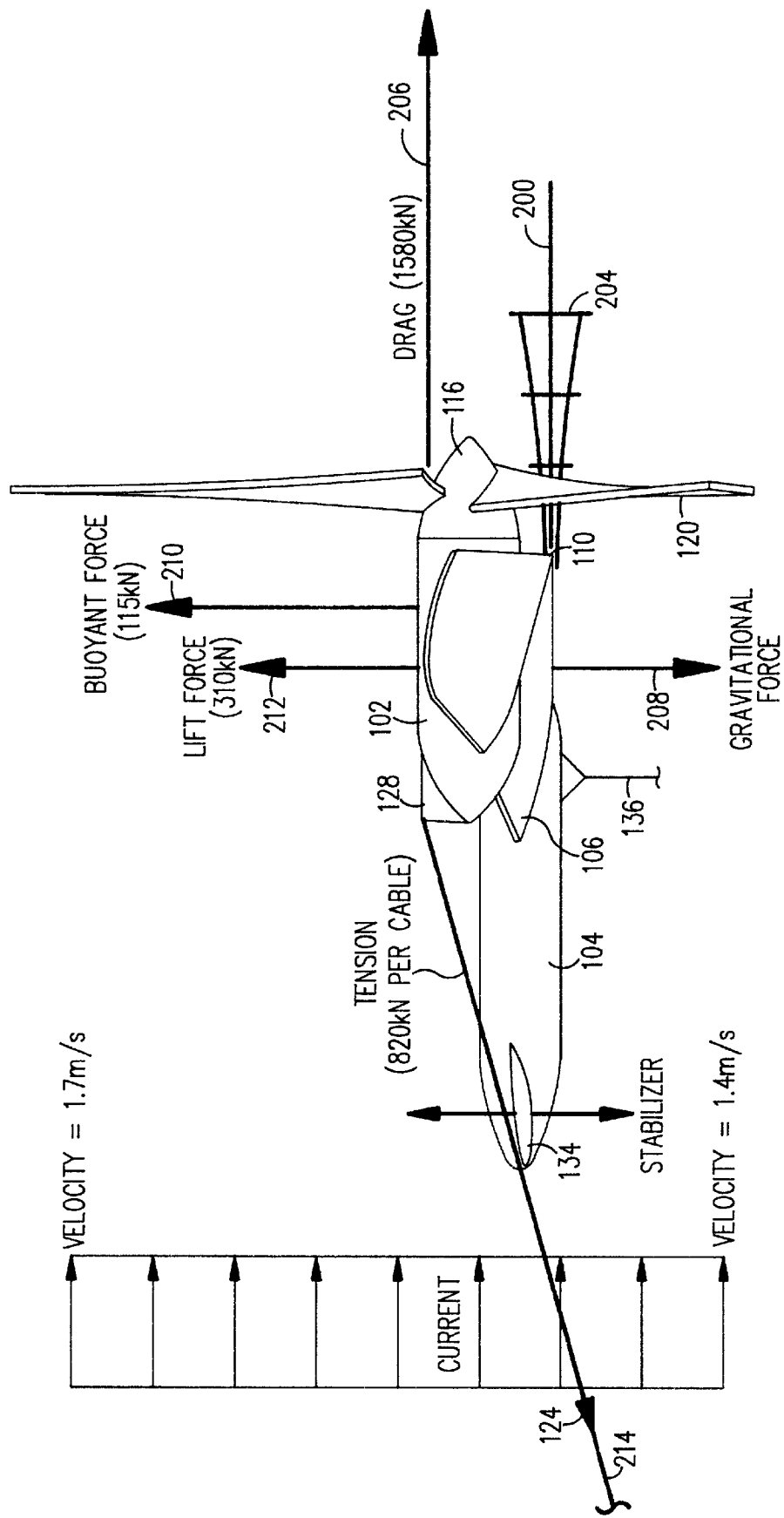
FIG. 2 is a side elevation of one of the power-generating nacelles shown in FIG. 1.

The electric generators in the nacelles 100, 102 are connected to neutrally buoyant power carrying cables (shown in FIG. 2). The neutrally buoyant power-carrying cables extend downstream from the device, within a cone shaped cage, to prevent entanglement with the rotor blades. Alternately, the power cables may extend upstream along the tether lines before inter-connecting to the other units or to the shore-based power grid.

The underwater power-generating device is restrained against the current with the tethers 122, 124, deployed at a selected angle to the ocean floor. A variable downstream drag force, illustrated by an arrow, is produced by the flow of water around the underwater power-generating device and varies as the square of the water current velocity. The greatest portion of this drag is generated as the flow passes across the plane of the two rotors. In addition, the device produces a greater drag while the rotors are being rotated by the water current and driving the generators than while the rotors are not rotating, and the minimum drag occurs when the blades are feathered (parallel to the flow) or are at zero pitch (perpendicular to the flow). If the blades are at a zero pitch or are fully feathered, the drag exerted by the flow on the rotors is small, and the lift force exerted by the flow on the rotor blades is minimal or zero, resulting in no rotation. As the drag of the blades is reduced, the velocity of the flow across the hydrofoil increases, resulting in increased lift forces on the hydrofoil. FIG. 2 is a side elevation view of one of the power-generating devices shown in FIG. 1. The drag exerted on the underwater power-generating device, coupled with the tether angle, results in a variable downward force proportional to the square of the water current velocity. This is compensated for by combining buoyant force and lift force on the hydrofoil.

The device is subject to essentially four major forces acting in the vertical direction: gravity, buoyancy, lift, and the vertical component of the tether tension. The vertical component of the tether tension is proportional to the downstream drag force, which is proportional to the square of the current velocity. This downward drag translation is produced by the angle of tether relative to the direction of the current flow. The buoyant force, shown by an arrow, is generated by the net positive buoyancy of the device adjusted by the ballast tanks. The lift force is a lifting force produced by the current flowing past the wing. By adjusting or compensating for changes in one or more of the above forces, the depth of the underwater power-generating device will passively stabilize and can also be controlled by a control mechanism. For example, the depth may be controlled with a combination of buoyancy and stabilizer adjustments.

Figure 3:
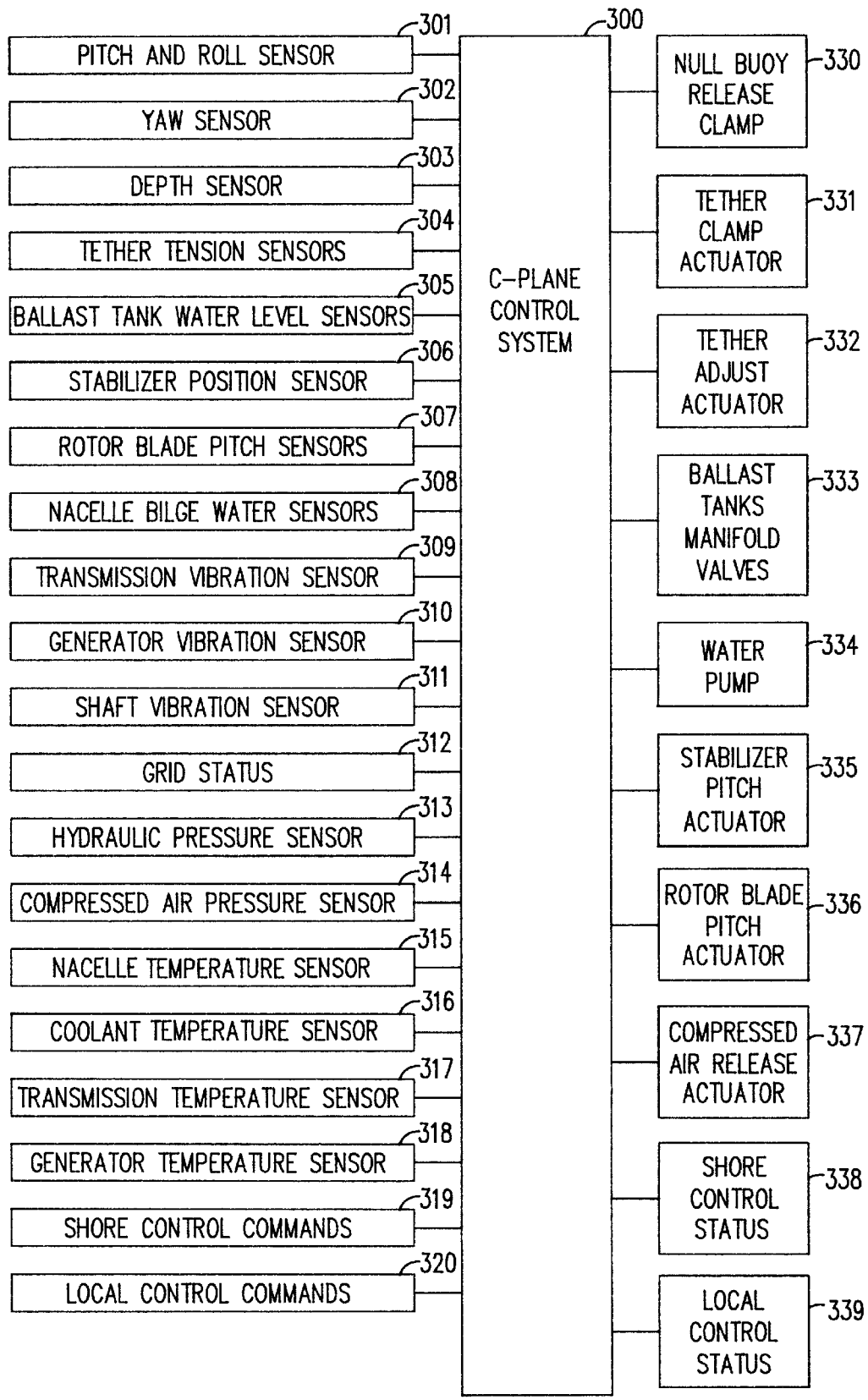
FIG. 3, is a block diagram of a control system for controlling operation of the device shown in FIG. 1.

The block diagram of FIG. 3, along with the flow diagrams of FIGS. 4–10, and illustrations of FIGS. 11–16, show a control system and software for controlling operation of the device shown in FIG. 1. In FIGS. 11 through 16, the depth position of the underwater power-generating device is represented by the two rotor discs. At a particular site, for example, the depth range of operation may be between a minimum depth of 30 meters and a maximum depth of 70 meters with the desired operating depth at 50 meters.

The vertical lift, buoyancy, gravity, and drag forces balance at a given flow velocity. The device will passively seek this given flow velocity, generating therein a given electrical output. This passive stability is a characteristic generated by currents that decrease in velocity with increasing depth, as is the case for many aquatic systems. As flow increases, downward drag is increased, and the device will descend into slower moving waters until it reaches the given flow velocity. Oppositely, as flow decreases, the device will rise into faster moving waters until it finds the given flow velocity. To prevent the device from rising above a depth where the blades become exposed to surface conditions and from descending below the design depth, active control is provided to keep the device within a range of depths.

The device position is controlled between a maximum depth and a minimum depth in a water current flowing in a known direction and current velocity. The maximum and minimum depths for operation and maximum operational velocity of an underwater power-generating device are programmed into a control processor, which is part of the control system 300, from a command control center 301. The command control center 301 may be an on-shore command center, a satellite or other remote source of commands. For example, the device may be programmed with 30 meters as the selected minimum depth, 70 meters as the selected maximum depth, and 1.70 meters per second as the selected maximum velocity.

Twenty-one sensors are input to the control processor 300 as shown in FIG. 3. They are pitch and roll 301, yaw 302, depth 303, cable tension 304, buoyancy tank content 305, stabilizer position 306, rotor blade pitch 307, nacelle bilge water 308, vibration detection on the transmission, generator and shaft bearings 309, 310, 312, grid status, 313, hydraulic pressure 314, compressed air 315, temperature of nacelle, coolant, transmission and generator 316, 317, 318, 319, shore control command 320, and local control command 321 sensors. These sensors provide information to the control processor 300 and identify conditions requiring shutdown. Shutdown conditions include (1) grid loss (2) excessive vibration from tether failure, a failed gear box, a failed generator, a cracked rotor blade, wave and turbulence effects, etc. (3) excessive temperature in the generator, gear box, nacelle air, etc. (4) excessive wing pitch (5) excessive yaw and (6) excessive roll.

The control processor 300 outputs are coupled to a null buoy release clamp 330 for allowing a buoy to ascend to the surface to facilitate device retrieval, a cable clamp actuator 331 and cable adjust actuator 332 for adjusting yaw, manifold valves 333 for adjusting ballast tank contents, a water pump 334, a stabilizer pitch actuator 335, blade pitch actuators 336 on each rotor blade, compressed air release actuator 337 for allowing ballast chambers to be voided of water, shore control status connection 338, and local control status connection 339.

The control processor 300 can send signals to and receive signals from the stabilizer actuator and pitch sensor to control its angle of attack and thus the lift force produced by the pitch-adjusting stabilizer 134. By altering the lift of the stabilizer, the pitch and therefore the lift of the main hydrofoil may be altered. A spoiler on the top surface of the hydrofoil may also be activated to reduce lift. Additionally, the ballast manifold valves can be controlled to move ballast forward or aft within the main hydrofoil, altering the pitch and lift of the hydrofoil.

The control processor 300 is coupled, via the manifold valve controller 333 and compressed air release actuator to the ballast tanks. The control processor 300 can control the buoyancy of the ballast tanks by sending signals to and receiving control signals from the control valves to add or purge water from the ballast tanks.

The control processor 300 is coupled, via the rotor blade pitch controller 336 to the rotor blades. The control processor 300 can alter the pitch of the rotor blades to change the drag exerted by the water current on the rotors, and thus the depth of the device.

The control processor causes the device to raise or lower in depth by invoking an ascend protocol or a descend protocol. These protocols initiate adjustment of the variable pitch of the rotor blades, the variable buoyancy of ballast tanks, or the variable lift of the hydrofoil. The control processor 300 maintains the underwater power-generating power device at a desired operating depth, located between the selected maximum and minimum depths. The control processor 300 may be a microprocessor that is programmed to perform the functions described.

In operation, the control processor 300 will be set with upper and lower limit for the depth at which the system may operate. The underwater power-generating device will be lowered to the center of the depth range and the buoyancy and lift will be set to stabilize the underwater power-generating device under the existing current flow velocity. Since the combination of buoyant force and lift force correspond to a specific flow velocity to counter-balance the drag force, the control processor 300 will cause the device to passively remain in operation at the depth where that specific flow velocity is present. Generally, a small increase in the current velocity will drive the underwater power-generating device deeper. A small decrease in the current velocity will drive the underwater power-generating device to a shallower depth, away from the ocean bottom. This is because the flow velocity generally decreases with increasing depth, with the highest velocities found nearer to the surface. For example, in the upper 100 meters of certain ocean current regimes, a current velocity increase or decrease of about 0.1 meters per second will result in a 10 meter decrease or increase in operating depth, respectively. The control processor 300 can be programmed to use the pitch-adjusting stabilizer and/or spoiler, the adjustable ballast tanks, and the variable pitch rotor blades to bring the underwater power-generating device back to the centerline depth as described above.

As an example, the centerline depth of operation in an ocean current may be about 45 meters to about 55 meters below the surface of the water. The objective is to maintain the underwater power-generating device at a desired operating depth between a selected maximum depth and a selected minimum depth for normal operations. Generally, electrical power generation is maximized up to the peak operating efficiency of the generator, consistent with the water current speed for which the rotors are designed.

Figure 4:
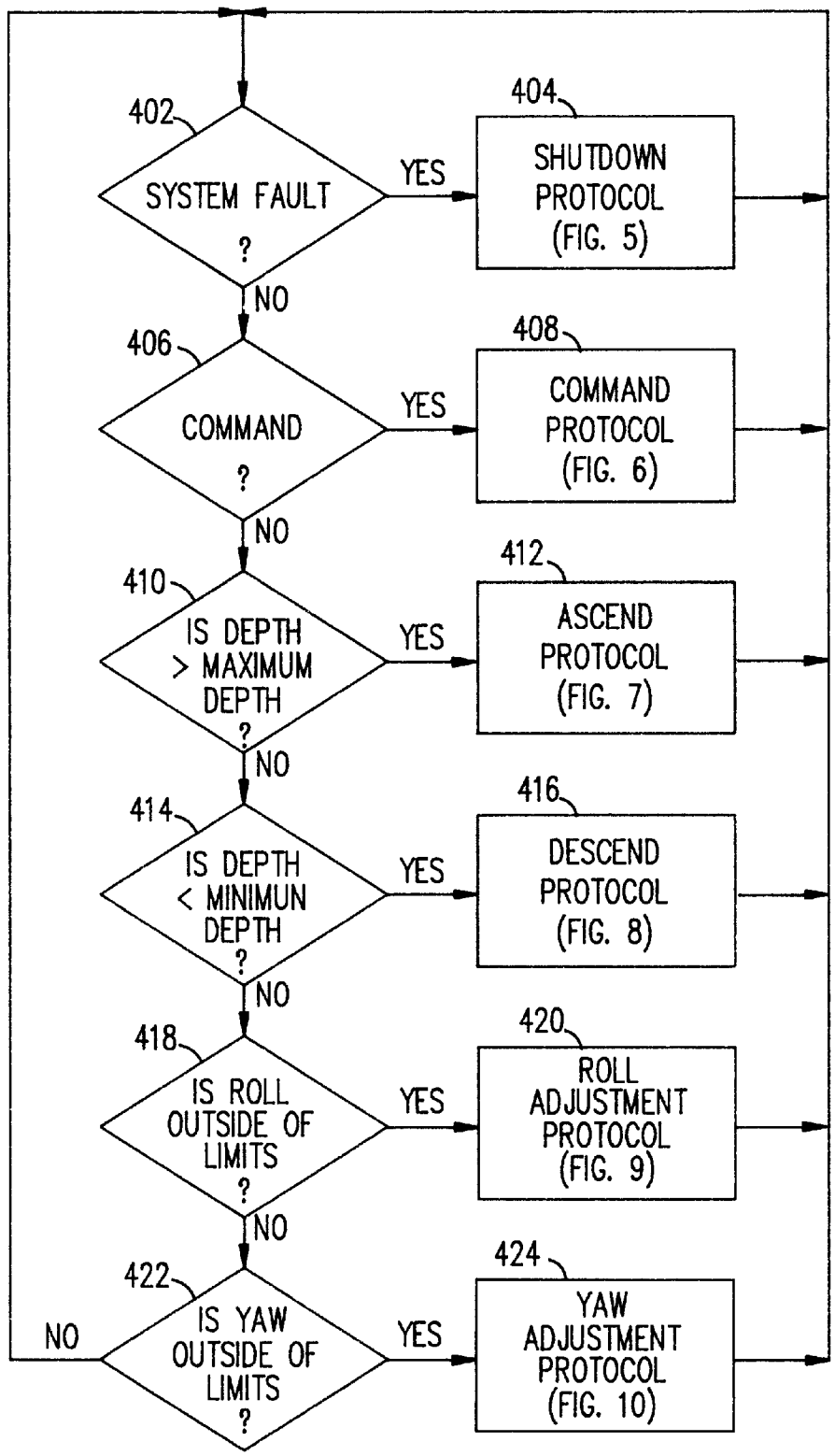
FIG. 4 is a flow diagram of control software for the device shown in FIG. 1.

FIG. 4 is a flow diagram of control software for the device of FIG. 1. The control processor 300 is programmed to control the device in response to several situations. (1) In response to a system fault 402, the processor invokes a protocol to shut down the device; (2) to respond to commands 406 issued to it from the command control center 301, the processor invokes a command protocol 408; (3) to operate the underwater power-generating device between a maximum depth 410 and minimum depth 414 or to raise the device to the surface for maintenance or to lower the device to avoid surface events, the processor invokes an ascend protocol 412 or a descend protocol 416; (4) if roll is outside limits 418, the processor invokes a roll adjustment protocol 420; and (5) if yaw is outside limits 422, the processor invokes a yaw adjustment protocol 424.

Figure 5:
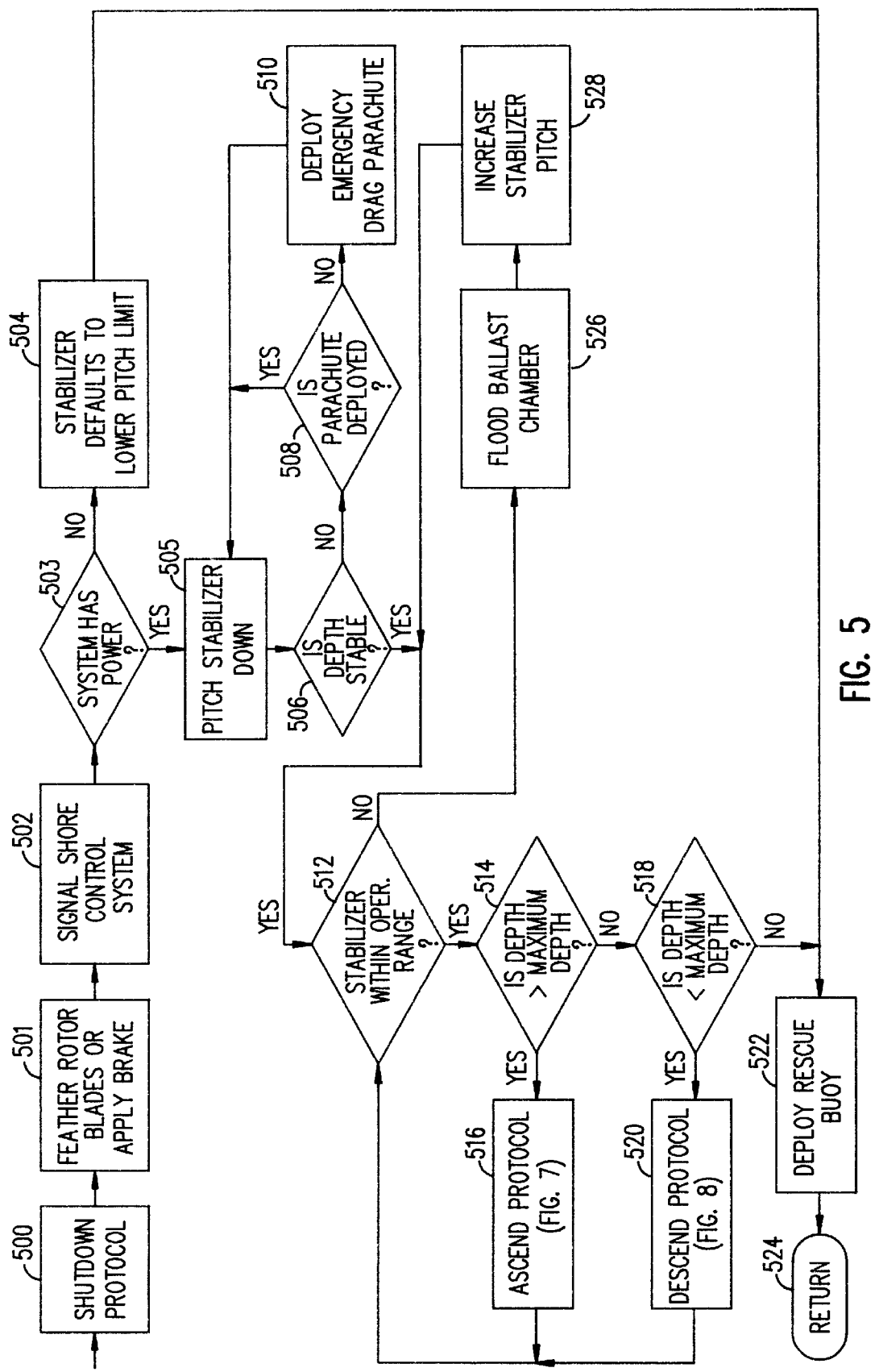
FIG. 5 is a flow diagram of the emergency shutdown protocol shown in FIG. 4.

Refer to FIG. 5, which is a flow diagram of the shutdown protocol shown in FIG. 4. In a shut down situation, the rotor blades are feathered or rotated to a zero pitch 501, causing an immediate reduction in the drag force, and a rotor brake is applied. At the same time, the system signals the shore control system of the condition 502. The buoyant force and the lift force, if not adjusted for the reduction in drag force, would cause the underwater power-generating device to ascend towards the surface. To avoid this, the pitch-adjusting stabilizer is immediately adjusted 505 or spoilers on the hydrofoil are deployed to reduce lift forces, maintaining the force balance required to hold the device at the desired operating depth. If the minimum depth is passed 508, an emergency parachute is deployed 510 to replace the drag of the rotors, thereby inducing descent.

In the case that electric power and hydraulic pressure are not available to control the actuators 503, the stabilizer automatically pitches downward to the "null" detent, a position which results in a maximum downward pitch angle and lift force reduction on the main hydrofoil. The underwater power-generating device will descend to a depth where the device's buoyancy, lift, and downward drag forces are balanced. A buoy, attached to the stabilizer by a cable, is then released to the surface such that the powerless apparatus may be readily located. The device may then be recovered to the surface by exerting sufficient tension on the cable to pitch the hydrofoil up in the current flow, allowing the device to ascend using its own lift.

If the downward stabilizer pitch exceeds the normal operating range 512, the buoyancy force may be gradually reduced by filling the ballast tanks 526, thereby permitting the stabilizer to be returned to within its normal operating range and maintaining the device within the desired operating depth range. With the foregoing control protocol, the drag force, buoyant force and lift force will be reduced, compared to the pre-shutdown state. Although the ballast tanks are filled, the net buoyancy force remains positive by design, precluding the device from submerging below a crush depth. This safety factor results from the existence of a downward drag force, which will balance the minimum buoyant force; this drag force is associated with a corresponding current velocity, which is never exceeded below the maximum design depth. Once the stabilizer is returned to within the normal operating range, the depth is adjusted by invoking the ascend protocol 516 or the descend protocol 520.

Figure 6:
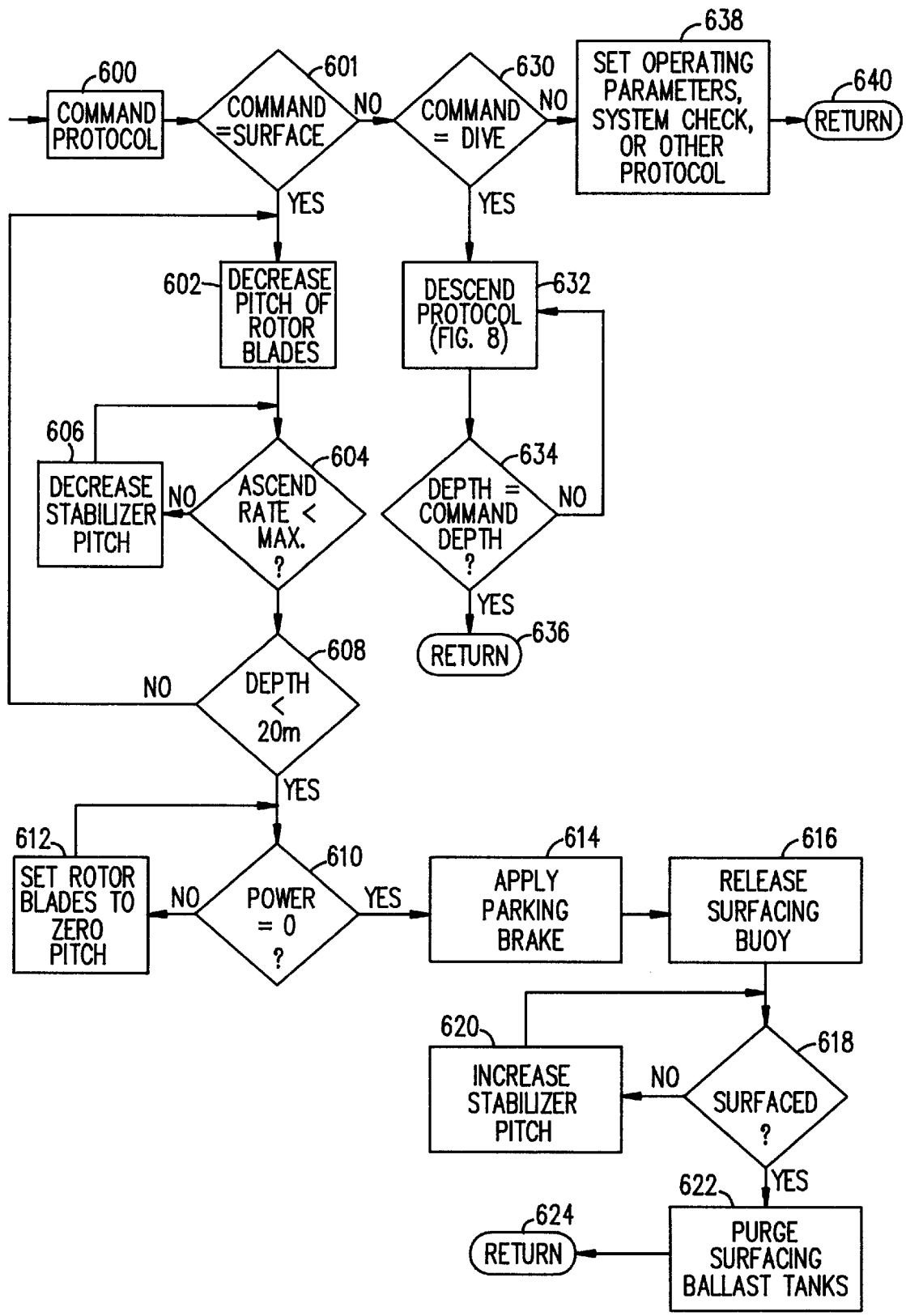
FIG. 6 is a flow diagram of the command protocol shown in FIG. 4.
Figure 13:
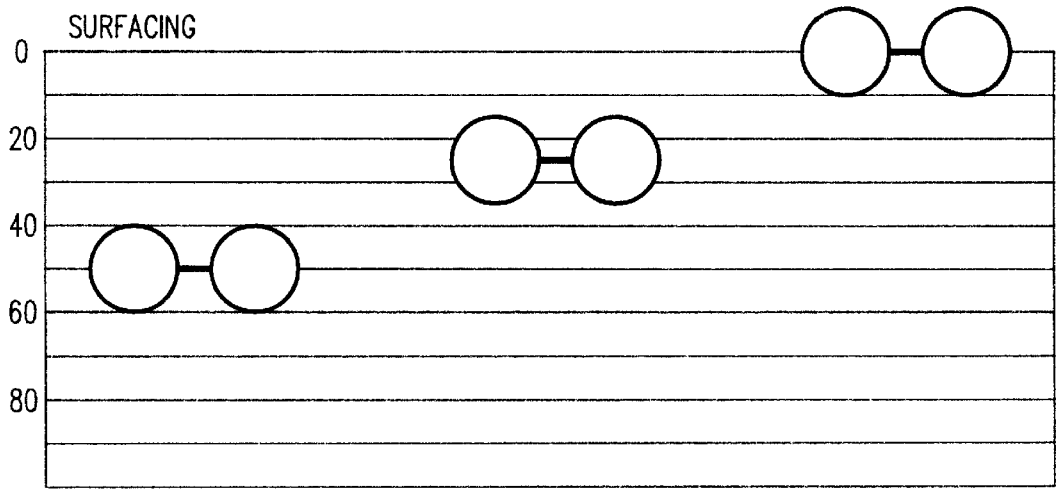
FIG. 13 illustrates the case wherein the underwater power-generating device is surfaced in response to a command.

FIG. 6 is a flow diagram of the command protocol shown in FIG. 4 and FIG. 13, and illustrates the case wherein the underwater power-generating device is surfaced in response to a command 601. The rotors' blades are gradually feathered or turned to zero pitch 602, reducing the drag produced and allowing a gradual ascent. As the device ascends, its ascent rate is controlled by adjusting the pitch of the stabilizer and the resulting hydrofoil lift 604,606. The rotor blades are feathered or turned to zero pitch 612 so that power production is zero 610, and a parking brake is applied 614, locking the rotors in position. A buoy, attached to the stabilizer by a cable, is released to the surface 616 to aid in locating the device from the surface before the device itself surfaces. If necessary, the stabilizer is used 618, 620 to add lift to bring the device to the surface. At near-surface, buoyancy is added for stability and to elevate access hatches above the ocean surface. This is accomplished by purging the ballast tanks of fluid 622. When the underwater power-generating device reaches the surface, the primary operative force is the buoyant force, supplemented by purged surfacing ballast tanks. The lift and drag forces are substantially reduced at the surface.

If the underwater power generating device is commanded 630 to dive below the normal operating depth range, a new depth range is specified and the descend protocol is enacted 632 until the device is at the new command depth 634. Additionally, the command to the device may entail changing operating parameters, performing a system check, or performing a manual override on normal operating procedures 638.

Figure 7:
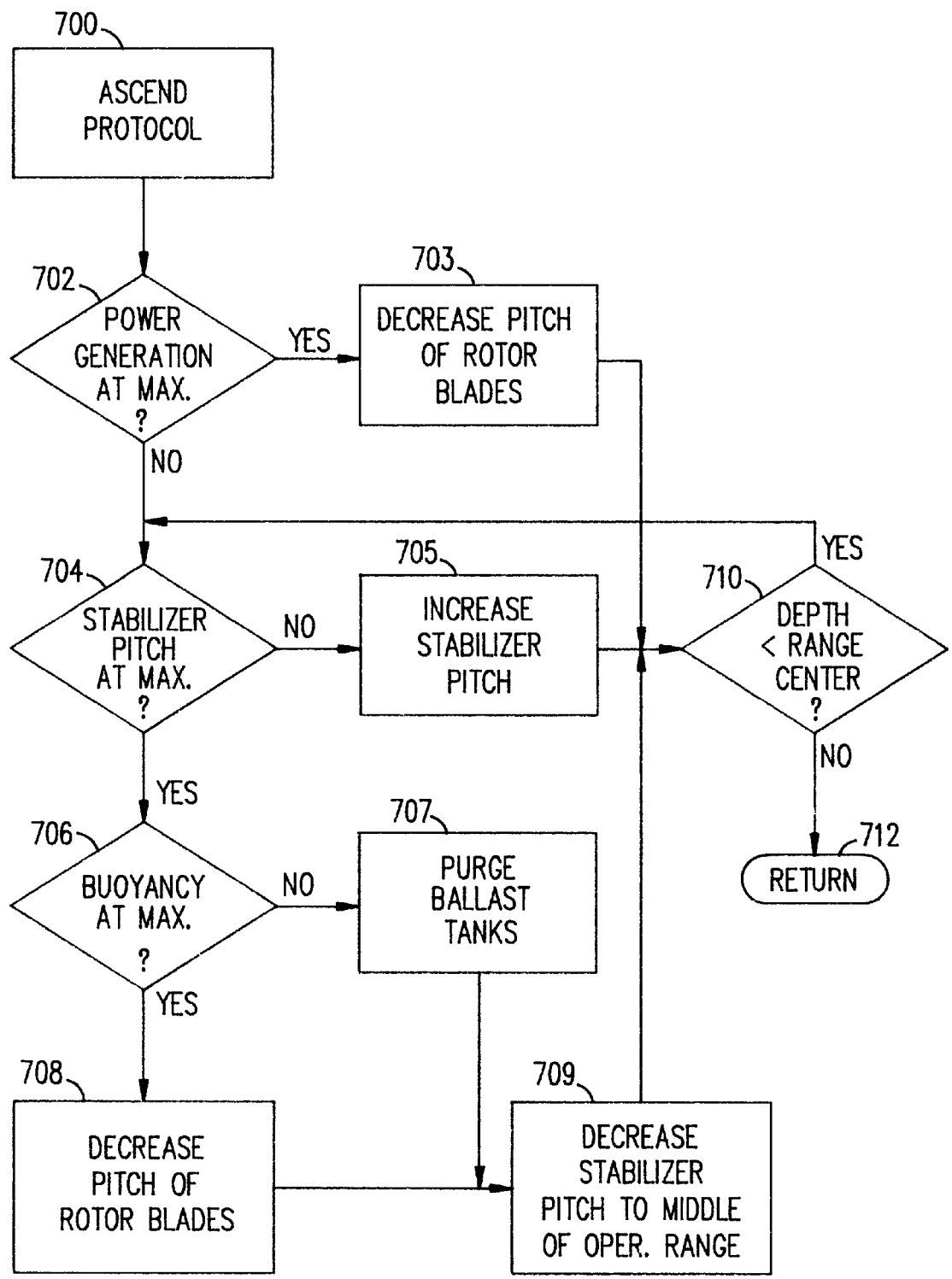
FIG. 7 is a flow diagram of the ascend protocol shown in FIG. 4.
Figure 12:
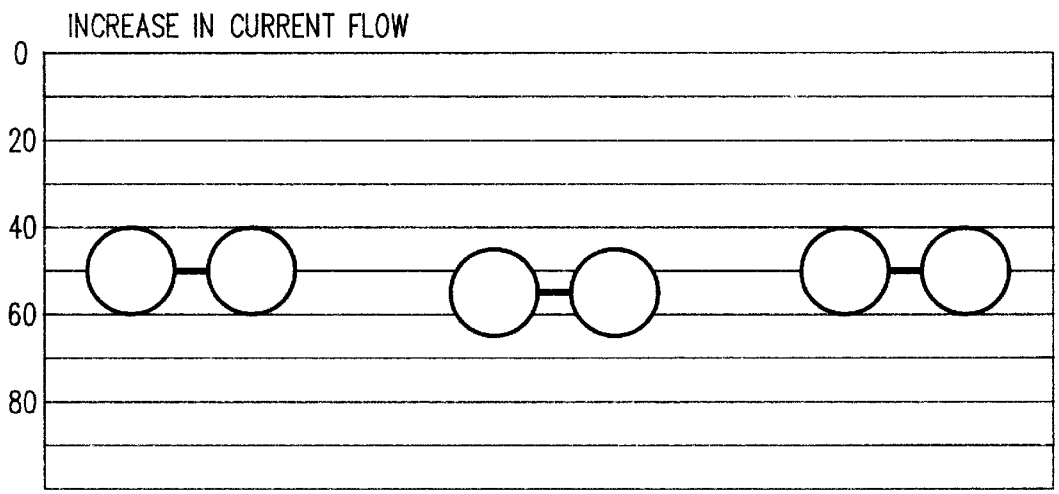
FIG. 12 illustrates the case wherein an increase in flow velocity increases drag.

FIG. 7 is a flow diagram of the ascend protocol shown in FIG. 4. In FIG. 12, an increase in flow velocity increases drag, causing the underwater power-generating device to descend from the desired depth to a greater depth where the maximum operational depth is exceeded. The pitch-adjusting stabilizer is adjusted to increase the lift force on the wing, causing the device to rise back to the desired depth. As a result of this adjustment, the lift and drag forces are increased, and the device operates at a higher power output due to the faster current found as depth decreases.

If power output from the device is at maximum 702 when the increase in flow velocity forces the device to the maximum depth limit, the pitch of the rotor blades is decreased 703, reducing drag and power generation. If the power generation is not at maximum and the stabilizer pitch is not at maximum 704, the pitch of the stabilizer is increased 705 until the depth is at the center of the operating depth range 710, thereby increasing power production by ascending into a faster water current. If the stabilizer pitch is at an upward maximum, and buoyancy is not at maximum 706, the ballast tanks are purged 707, allowing the device to ascend into a higher velocity where it generates greater power output. If buoyancy is at maximum 706, the pitch of the rotor blades is decreased 708 and the stabilizer pitch is decreased to the middle of its operating range 709.

Figure 8:
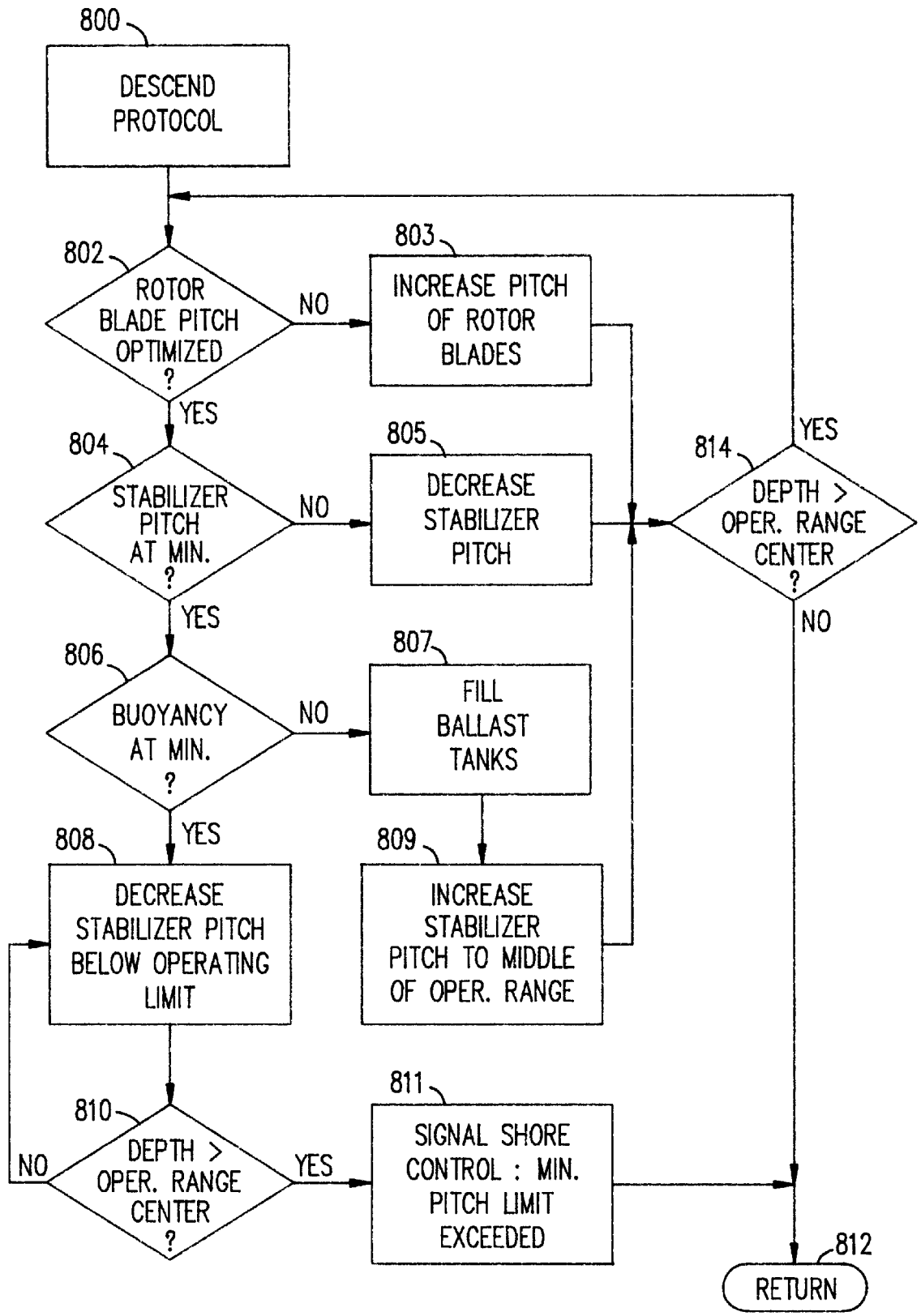
FIG. 8 is a flow diagram of the descend protocol shown in FIG. 4.
Figure 11:
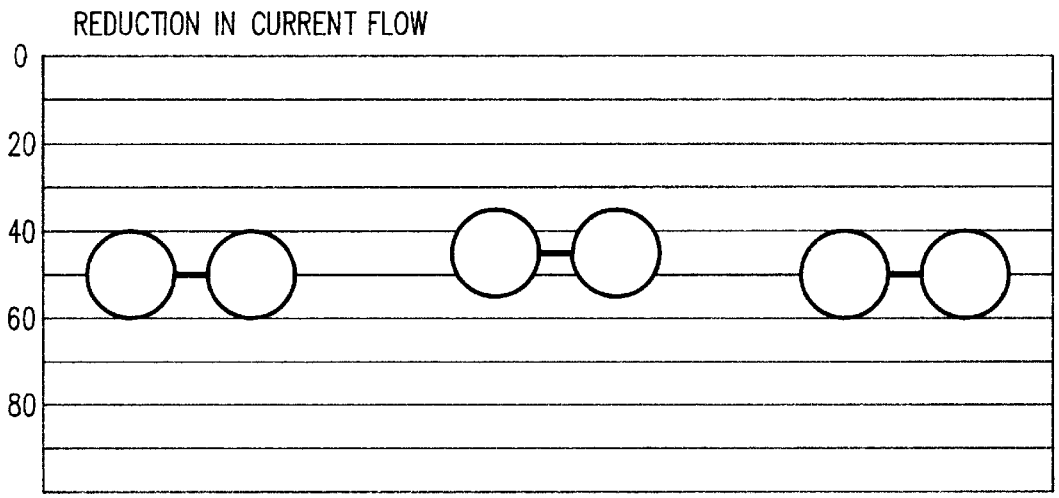
FIG. 11 illustrates the case wherein a reduction in flow velocity reduces drag.

FIG. 8 is a flow diagram of the descend protocol shown in FIG. 4. In FIG. 11, a reduction in flow velocity reduces drag. The buoyant and lift forces cause the underwater power-generating device to tend to rise to a shallower depth where the minimum depth is exceeded or breached. The pitch-adjusting stabilizer is adjusted downward to reduce the lifting force on the wing, causing the underwater power-generating device to descend to the desired depth where current velocity is less, thereby causing the device to operate at a lower power output.

If the rotor blades are not optimally pitched for power production 802, the rotor blade pitch is adjusted 803, increasing drag, until the depth is stabilized 814. If the rotor blade pitch is optimum for power production and the stabilizer pitch is not at a downward maximum 804, the pitch of the stabilizer is further decreased 804 until the depth is stabilized 814. If the stabilizer pitch is at a downward maximum 804 and buoyancy is not at minimum 806, the ballast tanks are filled 807. If buoyancy is at minimum 806, then the stabilizer is pitched further downward beyond the normal operating range 808 until the depth is stabilized 810, and the controller signals 810 that the maximum downward stabilizer pitch has been reached.

Figure 9:
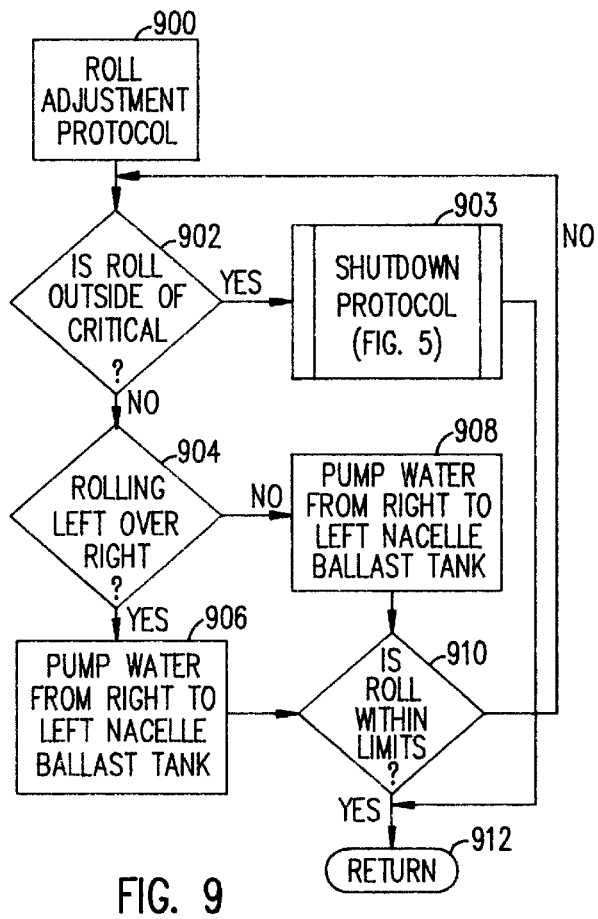
FIG. 9 is a flow diagram of the roll adjustment protocol shown in FIG. 4.

FIG. 9 is a flow diagram of the roll adjustment protocol shown in FIG. 4. Roll is sensed by a roll sensor. If the roll is outside of a critical amount 902, the shutdown protocol 903 is invoked. If the roll is not outside of a critical amount 902, but is rolling right over left, an amount of water is pumped from the left nacelle to the right nacelle ballast tank 906. If the roll is not outside of a critical amount 902, but is rolling left over right, an amount of water is pumped from the right nacelle to the left nacelle ballast tank 908. In each case, water is pumped in increments until the roll is brought to within limits 910 and the process ends 912.

Figure 10:
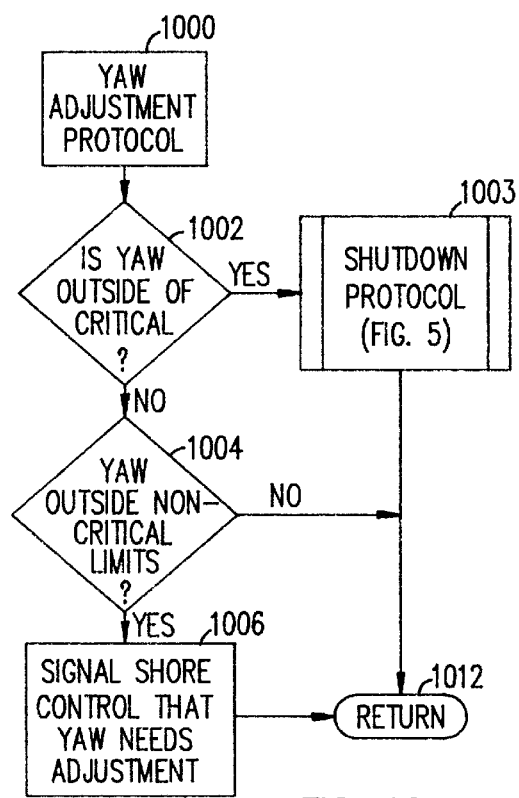
FIG. 10 is a flow diagram of the yaw adjustment protocol shown in FIG. 4.

FIG. 10 is a flow diagram of the yaw adjustment protocol shown in FIG. 4. Yaw is sensed by a yaw sensor, such as a weather vane shaped device with an output proportional to the angle of yaw from a center position. If the yaw is outside of a critical amount 1001, then a tether-adjusting capstan is activated, shortening one tether while the other tether is lengthened until the yaw is eliminated, or the emergency shutdown protocol 1005 is invoked. If the yaw is not outside of a critical amount 1002, but is outside of a non-critical amount 1004, then a control message 1006 is sent over a response line to the command control center 301 that yaw needs to be adjusted at the next scheduled surface maintenance, and the process ends 1012.

Figure 14:
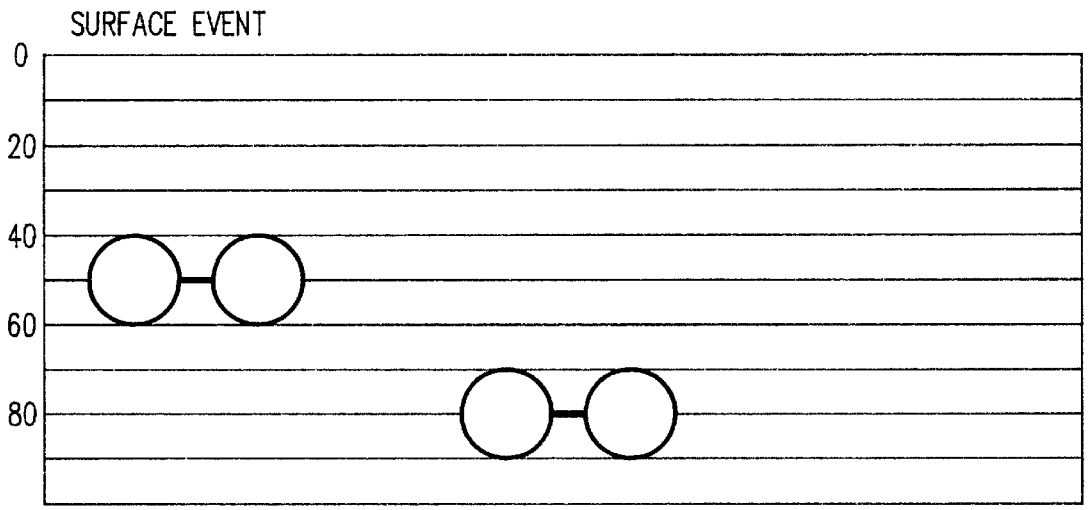
FIG. 14 illustrates the case wherein a surface event, such as a storm surge, requires that the underwater power-generating device be submerged beyond a 50-meter depth

In FIG. 14, a surface event, such as a storm surge, requires that the underwater power-generating device be submerged beyond the design depth. In FIG. 6, the dive command 630 specifies a command depth (for example, 80 meters). The descend protocol 632 is invoked. The pitch-adjusting stabilizer is adjusted to decrease lift, causing the device to descend into a reduced equilibrium current velocity located at a lower 80-meter depth. The buoyancy force may also be reduced by filling the ballast tanks. Following this adjustment to greater depth, the device stabilizes, the drag, buoyant and lift forces are reduced, and the generated power output decreases.

Figure 15:
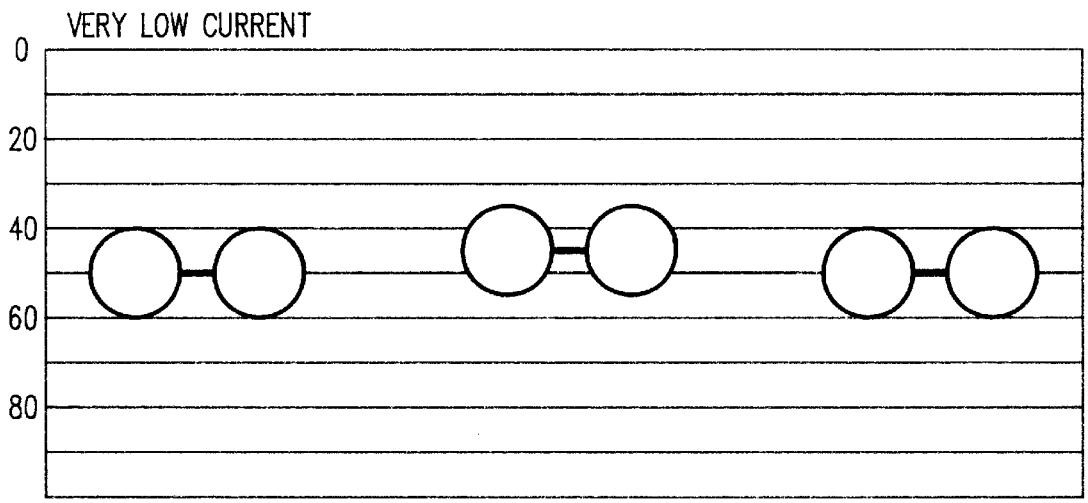
FIG. 15 illustrates the case wherein the underwater power-generating device is exposed to an abnormally low current velocity; and, FIG. 16 illustrates the case wherein the underwater power-generating device is exposed to an abnormally high current velocity.

In FIG. 15, the underwater power-generating device is exposed to an abnormally low current velocity. A decrease in the current velocity decreases drag and the corresponding downward force, resulting in the buoyancy and lift force causing the device to rise to a shallower depth, breaching the minimum depth level, block 414 in FIG. 4. The descend protocol is invoked 416. The underwater power-generating device is moved deeper by reducing the sum of the buoyancy and lift forces to match the decrease in drag at the low velocities found within the operating depth range, thereby returning the device to the center of the operating depth range. The drag force is reduced, as is the sum of the buoyant and lift forces enabling operation in low velocities at the desired depth.

Figure 16:
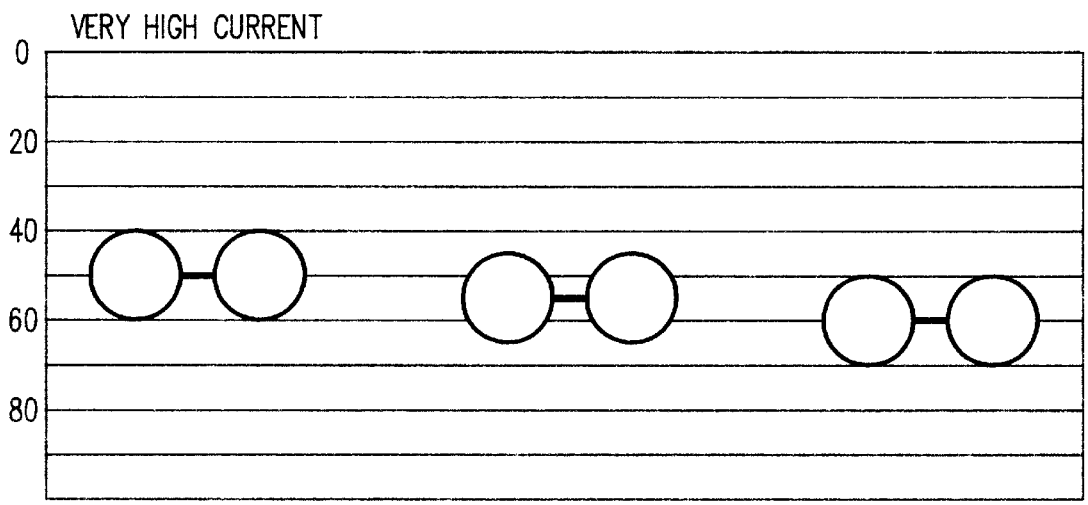

FIG. 16 illustrates the case wherein the underwater power-generating device is exposed to abnormally high current velocities. An increase in current velocity increases drag, causing the underwater power-generating device to descend from the desired depth to a deeper depth, which exceeds the maximum normal operating depth established for the device. The rotor blades are gradually feathered or turned to zero pitch, or the device is allowed to move into a deeper equilibrium depth, thereby limiting the maximum downstream drag that may be exerted on the device. If the device is allowed to exceed the maximum normal operating depth, the drag, buoyancy and lift forces remain substantially constant as the device descends in response to the high velocity flow.

As an example, a desired depth range may be between 30 meters and 70 meters with the operating depth being the centerline at 50 meters. However, by remaining within this depth band when the current velocity is low, the underwater power-generating device operates at less than its rated power. In contrast, if the current velocity in the depth band exceeds the upper design limit, the device may be allowed to descend into deeper waters until the current velocity being encountered by the device reaches said upper velocity limit.

The current velocity over the wing, with the rotors operating and optimally pitched for power production, is expected to be substantially less than the free-stream velocity, reducing the hydrofoil's lift significantly.

EPILOGUE

What has been described is an apparatus and method of controlling a tethered, underwater, water current-driven turbine, power-generating device. A predetermined maximum depth and a predetermined minimum depth are set. In response to sensing depth of the device, an ascend protocol or a descend protocol are selectively invoked. These protocols maintain an operating depth of the device that is preferably midway between the predetermined maximum depth and the predetermined minimum depth. The turbine includes a hydrofoil for lift and variable-pitch rotor blades. A maximum allowable drag force load on the turbine rotors is selected. The pitch of the variable-pitch rotor blades on the turbine is adjusted such that the drag force loading of the device does not exceed a maximum design level.

It will be understood by those skilled in the art that the pitch of the blades may be changed by rotating all or sections of each blade around a blade longitudinal axis.

It will also be understood that lift produced by the device's hydrofoil may be adjusted by any suitable lift-adjusting mechanism, such as by adjusting the pitch of a moveable stabilizer or by adjusting the position of wing flaps or a spoiler.

The control of the device consists of balancing forces on the device by adjusting at least one of the parameters of:

i. lift of the hydrofoil with a lift-adjusting mechanism, such as by adjusting the pitch of the stabilizer or the position of the wing flaps or the spoiler, ii. buoyancy force of the ballast tanks by adjusting the amount of ballast held within the tanks, and, iii. drag force loading on the rotors by adjusting the pitch of the rotor blades, such that the device passively seeks an initial equilibrium velocity of water current, located within a chosen predetermined depth range and wherein the forces on the device are balanced, such that water flowing past the device is sufficient to keep the device within the depth range.

It will be understood by those skilled in the art that a suitable drag-inducing mechanism may be employed to further control drag of the device. For example, a parachute or parachutes may be encased within the device, which may be extended or ejected into the water flow;

The tethers restraining the device from yaw are adjustable in length by a yaw-adjusting mechanism wherein either the first tether is lengthened and the second tether is shortened, or the first tether is shortened and the second tether is lengthened. It should be understood that any suitable yaw-adjusting mechanism might be employed. For example, each tether may be wound around a moveable capstan or the first tether and the second tether may be connected to form a single tether, with the single tether being wound around a moveable capstan. A segment of chain, gears or teeth, with a corresponding mating structure on the capstan may be employed to keep the single tether from slipping.

While the invention has been particularly shown and described with reference to preferred embodiments thereof, it will be understood by those skilled in the art that the foregoing and other changes in form and detail may be made therein without departing from the scope of the invention.

What is claimed is:

1. A method of controlling a tethered, underwater, water current-driven turbine, power-generating device comprising:
   A. setting a predetermined maximum depth and a predetermined minimum depth;
   B. sensing depth of said device; and,
   C. in response to said sensing depth of said device, selectively invoking an ascend protocol or a descend protocol to maintain an operating depth of said device that is between said predetermined maximum depth and said predetermined minimum depth.

2. The method of claim 1 wherein said turbine includes turbine rotor blades, said method further comprising:
   D. selecting a maximum drag force loading and a maximum power generation of said turbine rotor blades; and,
   E. adjusting pitch of said turbine rotor blades such that said drag force loading and said power generation do not exceed said maxima.

3. The method of claim 1 wherein said device includes a hydrofoil and wherein said ascend protocol comprises:
   D. setting a quantity of ballast in said device; and,
   E. adjusting lift produced by said hydrofoil with a lift-adjusting mechanism, such that said device maintains a predetermined depth in said water current that is between said maximum depth and said minimum depth.

4. The method of claim 1 wherein said operating depth is midway between said maximum depth and said minimum depth.

5. The method of claim 3 wherein said operating depth is midway between said maximum depth and said minimum depth.

6. The method of claim 1 wherein said turbine is driven by adjustable pitch rotor blades, said method further comprising:
   D. decoding a shutdown command; and,
   E. in response to said decoding a shutdown command, adjusting pitch of said adjustable pitch rotor blades such that lift produced by said rotor blades and a rotational velocity of said rotor blades are reduced to near zero.

7. A method of controlling a tethered underwater device having a lift-producing hydrofoil, an adjustable pitch rotor blade-driven turbine, ballast tanks, and a lift-adjusting mechanism, comprising:
   A. sensing electrical energy output that is proportional to velocity of water current flowing past said device;
   B. sensing depth of said device;
   C. providing an initial net ballast to said device resulting in an initial positive buoyancy sufficient to remain above a maximum predetermined depth of said ballast tanks;
   D. balancing forces on said device by adjusting at least one of the parameters of:
      i. lift of said hydrofoil with a lift-adjusting mechanism,
      ii. buoyancy force of said ballast tanks by adjusting the amount of ballast held within said tanks, and,
      iii. drag force loading on said rotors by adjusting the pitch of said rotor blades, such that said device passively seeks an initial equilibrium velocity of water current, located within a chosen predetermined depth range and wherein the forces on said device are balanced, which when flowing past said device is sufficient to keep said device within said depth range; and,
   E. upon a condition that said initial equilibrium velocity changes to a new velocity that tends to urge said device out of said depth range, repeating step D to cause said device to operate at a new equilibrium velocity that is within said depth range.

8. The method of claim 7 wherein step E comprises:
   adjusting lift produced by said hydrofoil with said lift-adjusting mechanism to cause said device to operate at a new equilibrium velocity that is within said depth range.

9. The method of claim 7 further comprising:
   F. upon a condition that said adjusting of lift produced by said hydrofoil is ineffective to set a new equilibrium velocity that is within said depth range, adjusting ballast in said ballast tanks to set said new equilibrium velocity that is within said depth range.

10. The method of claim 9 further comprising:
    G. upon a condition that said adjusting of lift produced by said hydrofoil and said adjusting of buoyancy are ineffective to set a new equilibrium velocity that is within said depth range, adjusting pitch of said rotor blades such that said device passively seeks a new equilibrium velocity of water current, located within said chosen predetermined depth range.

11. A power-generating device comprising:
    a water current-driven turbine;
    said water current-driven turbine being tethered underwater;
    means for setting a predetermined maximum depth and a predetermined minimum depth;
    means for sensing depth of said device; and,
    means operative in response to said means for sensing depth of said device, for selectively invoking an ascend protocol or a descend protocol, said ascend protocol and descend protocol maintaining an operating depth of said device that is between said predetermined maximum depth and said predetermined minimum depth.

12. The power-generating device of claim 11 wherein said turbine is driven by adjustable pitch rotor blades, said device further comprising:
    means for selecting parameters related to a maximum drag force loading and a maximum power production of said turbine rotor blades; and,
    means for adjusting pitch of said adjustable pitch rotor blades on said turbine, including means for insuring that said drag force loading and said power production do not exceed said maxima.

13. The power-generating device of claim 11 wherein said ascend protocol comprises:
    means for setting a quantity of ballast in said device; and, means for adjusting lift produced by said hydrofoil by a lift-adjusting mechanism such that said device maintains a predetermined depth in said water current that is between said maximum depth and said minimum depth.

14. The power-generating device of claim 11 wherein said operating depth is midway between said maximum depth and said minimum depth.

15. The power-generating device of claim 12 wherein said operating depth is midway between said maximum depth and said minimum depth.

16. The power-generating device of claim 13 wherein said operating depth is midway between said maximum depth and said minimum depth.

17. The power-generating device of claim 11 wherein said turbine is driven by adjustable pitch rotor blades, said power-generating device further comprising:
    means for decoding a shutdown command; and,
    means operative in response to said decoding a shutdown command, for adjusting pitch of said adjustable pitch rotor blades such that the rotation, power output, and drag force loading of said rotor blades are reduced to a safe level.

18. A means for controlling a tethered underwater power-generating device having an adjustable pitch rotor blade-driven turbine, ballast tanks and a lift-adjusting mechanism, comprising:
    A. means for sensing an electrical energy output that is proportional to velocity of water current flowing past said device;
    B. means for sensing depth of said device;
    C. means for providing an initial net ballast to said device resulting in an initial positive buoyancy sufficient to maintain a depth that is above a maximum predetermined depth of said ballast tanks;
    D. means for balancing forces on said device by adjusting one or more of the following parameters:
        i. lift force of said hydrofoil using a lift-adjusting mechanism
        ii. buoyancy force of said ballast tanks by adjusting the amount of ballast held within said tanks, and,
        iii. drag force loading on said rotors by adjusting the pitch of said rotor blades, such that said device passively seeks an initial equilibrium velocity of water current, located within a chosen predetermined depth range and wherein the forces on said device balance, such that water flowing past said device is sufficient to keep said device within said depth range; and,
    E. further adjusting means operative upon a condition that said initial equilibrium velocity changes to a new velocity that tends to urge said device out of said depth range, for adjusting said parameters to operate at a new equilibrium velocity that is within said depth range.

19. The power-generating device of claim 18 further comprising:
    means for rebalancing forces on said device by adjusting lift produced by said hydrofoil, using said lift-adjusting mechanism, to cause said device to operate at a new equilibrium velocity that is within said depth range.

20. The power-generating device of claim 18 further comprising:
    ballast-adjusting means, operative upon a condition that said means for adjusting lift of said hydrofoil is ineffective to set a new equilibrium velocity that is within said depth range, for adjusting ballast in said ballast tanks to set said new equilibrium velocity that is within said depth range.

21. The power-generating device of claim 20 further comprising:
    rotor blade pitch-adjusting means, operative upon a condition that said adjusting lift of said hydrofoil and said adjusting buoyancy are ineffective to set a new equilibrium velocity that is within said depth range, for adjusting pitch of said rotor blades to set said new equilibrium velocity that is within said depth range.

22. A power-generating device comprising:
    water current-driven turbine;
    said water current-driven turbine being tethered underwater;
    a control processor;
    a predetermined maximum depth and a predetermined minimum depth being set in said control processor;
    a depth pressure gauge connected to said control processor; and,
    a first procedure in said control processor responsive to said depth pressure gauge, said first procedure selectively invoking an ascend protocol or a descend protocol to maintain an operating depth of said device that is between said predetermined maximum depth and said predetermined minimum depth.

23. The power-generating device of claim 22 wherein said turbine is driven by adjustable pitch rotor blades, said device further comprising:
    a rotor blades pitch sensor connected to said control processor;
    a rotor blades pitch control connected to said control processor;
    a maximum drag force loading and power production of said turbine rotor blades being selected in said control processor; and,
    a first procedure in said control processor responsive to said pitch of rotor blades sensor, said first procedure causing said rotor blades pitch control to adjust pitch of said adjustable pitch rotor blades on said turbine such that said drag force loading and said power production do not exceed said predetermined maxima.

24. The power-generating device of claim 22 further comprising:
    a lift-adjusting mechanism;
    said first procedure including a second procedure that sets a quantity of ballast in said device;
    a lift-adjusting mechanism control connected to said lift-adjusting mechanism and to said control processor; and,
    said first procedure further including a third procedure that causes said lift-adjusting mechanism control to adjust lift such that said device maintains a predetermined depth in said water current that is between said maximum depth and said minimum depth.

25. The power-generating device of claim 22 wherein said operating depth is midway between said maximum depth and said minimum depth.

26. The power-generating device of claim 23 wherein said operating depth is midway between said maximum depth and said minimum depth.

27. The power-generating device of claim 24 wherein said operating depth is midway between said maximum depth and said minimum depth.

28. The power-generating device of claim 22 wherein said turbine is driven by adjustable pitch rotor blades, said power-generating device further comprising:

a shutdown command input to said control processor; and, a fourth procedure in said control processor operative in response to decoding said shutdown command, for adjusting pitch of said adjustable pitch rotor blades such that said power output, said rotor rotation, and said drag force loading of said device are reduced to a safe level.

29. A power-generating device comprising:

a tethered underwater turbine;

said turbine having a lift-producing hydrofoil, adjustable pitch rotor blades, ballast tanks, and a mechanism to adjust lift produced by said hydrofoil;

a power output sensor connected to said control processor;

a depth pressure gauge;

an initial net ballast being in said device resulting in an initial positive buoyancy sufficient to maintain a depth that is above a maximum predetermined depth of said ballast tanks;

a first procedure balancing forces on said device by adjusting one or more of the following parameters:
  i. lift produced by said hydrofoil by adjusting said lift-adjusting mechanism;
  ii. buoyancy force of said ballast tanks by adjusting the amount of ballast held within said tanks, and,
  iii. drag force loading on said rotors by adjusting the pitch of said rotor blades; such that said device passively seeks an initial equilibrium velocity of water current, located within a chosen predetermined depth range and wherein the forces on the device balance, which when flowing past said device is sufficient to keep said device within said depth range; and, a lift-adjusting mechanism control;

said first procedure further including a second procedure operative upon a condition that said initial equilibrium velocity has changed to a new velocity that tends to urge said device out of said depth range, that causes said lift-adjusting mechanism control to adjust the lift force produced by said hydrofoil to operate at a new equilibrium velocity that is within said depth range.

30. The power-generating device of claim 29 further comprising:

said first procedure further including a third procedure, operative upon a condition that adjusting lift produced by said hydrofoil is ineffective to set a new equilibrium velocity that is within said depth range, that causes said ballast tank control to adjust ballast in said ballast tanks to set said new equilibrium velocity that is within said depth range.

31. The power-generating device of claim 30 further comprising:

rotor blades pitch control;

said first procedure further including a fourth procedure, operative upon a condition that adjusting lift produced by said hydrofoil and adjusting ballast in said ballast tanks are ineffective to set a new equilibrium velocity that is within said depth range, that causes said rotor blades pitch control to adjust pitch of said rotor blades to set said new equilibrium velocity that is within said depth range.

32. The power generating device of claim 31, further comprising:

a drag-inducing mechanism;

said first procedure further including a fifth procedure, operative upon a condition that adjusting lift produced by said hydrofoil, adjusting ballast in said ballast tanks, and adjusting said rotor blade pitch are ineffective to set a new equilibrium velocity that is below said minimum depth, that causes said drag-inducing mechanism to activate to set said new equilibrium velocity that is below said minimum depth.

33. The power-generating device of claim 22 wherein said device includes a lift-producing hydrofoil having a central section and two wings extending outward from said central section, said power-generating device further comprising:

first and second tethers restraining said device from yaw;

a winch positioned on said central section;

an anchoring member; and, a third tether, coupled between said winch and said anchoring member, said winch restraining said device from rising, countering lift and buoyancy produced by said hydrofoil and ballast chambers.

34. The power-generating device of claim 29 wherein said device includes a lift-producing hydrofoil having a central section and two wings extending outward from said central section, said power-generating device further comprising:

first and second tethers restraining said device from yaw;

a winch positioned on a bottom surface of said central section;

an anchoring member; and, a third tether, coupled between said winch and said anchoring member, said winch restraining said device from rising, countering lift and buoyancy produced by said hydrofoil and ballast chambers.

35. The power-generating device of claim 22 wherein said first and second tethers restraining said device from yaw are adjustable in length by a yaw-adjusting mechanism.

36. The power-generating device of claim 34 further comprising:

a yaw sensor;

a control processor;

a procedure in said control processor responsive to said yaw sensor, said procedure selectively invoking a protocol to lengthen said first tether and shorten said second tether or shorten said first tether and lengthen said second tether.

37. The power-generating device of claim 35 wherein said first tether and said second tether are connected to form a single tether, and said yaw adjusting mechanism comprises winding said single tether around a moveable capstan.

38. The power-generating device of claim 29 wherein said first and second tethers restraining said device from yaw are adjustable in length by a yaw-adjusting mechanism.

39. The power-generating device of claim 33 further comprising:

a yaw sensor;

a control processor;

a procedure in said control processor responsive to said yaw sensor, and said procedure selectively invoking a protocol to lengthen said first tether and shorten said second tether or shorten said first tether and lengthen said second tether.

40. The power-generating device of claim 38 wherein said first tether and said second tether are connected to form a single tether, and said yaw adjusting mechanism comprises winding said single tether around a moveable capstan.

* * * * *